Patented Oct. 13, 1953

2,655,451

UNITED STATES PATENT OFFICE 2,655,451

COATED FOOD CONTAINER

Albert C. Edgar, Palos Heights, Ill., assignor to Wilson & Co., Inc., a corporation of Delaware No Drawing. Application April 9, 1947, Serial No. 740,487

11 Claims. (Cl. 99—187)

This invention relates to methods for preventing the adhesion of meat to the inner surfaces of containers therefor. It also relates to new and useful coating materials for meat cans and to cans coated with such materials.

In the manufacture of canned meats such as luncheon meats, corned beef hash, spiced ham, potted meats, salmon and the like, the cans are filled with the meat, covered, and sealed. The sealed cans are then placed in a steam retort or similar cooker, and cooked, frequently under pressure, for about one to two hours, the amount of pressure and the time of cooking depending on the kind of meat and the size of can used.

A serious problem in the manufacture of canned meats has been the tendency of these products to adhere to the interior surfaces of the cans. This adhesion of meat to the can not only causes difficulty in effecting a complete removal of the contents of the can, but also results in wastage and inconvenience to the consumer who has to scrape off the adhering meat from the sides and bottom of the container. Furthermore, the appearance of the contents is frequently impaired, particularly with products such as luncheon meats which are removed from the can as a rigid cohesive unit, because portions of the adhering surface meat are torn away during removal of the meat from the can.

This tendency of the meat to adhere to the can occurs not only when the inner surfaces of the cans are untreated sheet iron, but also when they have been lacquered, tin-coated, or otherwise treated in accordance with standard procedures.

It has been found, and it is common practice in the industry, that the application of a film of melted lard to the inner surfaces of cans has some beneficial effect in minimizing this adhesive tendency. However, such a treatment is only partially successful and far from satisfactory. The application of a film of gelatin to the inside surfaces of meat cans has also been practiced in the endeavor to prevent adhesion of meat to the sides of the cans, but without real success.

Another means used in the industry in combating this problem is to encase the meat in paper, such as parchment and like papers, before placing the paper-covered meat in the can. Such a treatment is also unsatisfactory because, while there is no adhesion of meat to the walls and bottom of the can, there is considerable adhesion of meat to the paper.

I have discovered that I can eliminate adhesion between the interior surfaces of a can and the surfaces of meat contained therein, by applying to the interior surfaces of the can, a thin film of a non-hydroxy material selected from the group consisting of polyhydroxy alcohol partial esters of those higher saturated and unsaturated fatty acids containing at least 12 carbon atoms, inner ethers of hexahydroxy alcohol partial esters of those higher saturated and unsaturated fatty acids containing at least 12 carbon atoms, and mixtures thereof. Examples of such materials are glycerol mono-oleate, glycerol mono-stearate, mannitol mono-oleate, mannitol mono-stearate, sorbitol mono-oleate, sorbitol mono-palmitate, mannitan mono-oleate, mannitan mono-stearate, sorbitan mono-palmitate and sorbitan mono-stearate.

My invention will be readily understood from the following specific examples. These examples, it will be understood, are illustrative only, and are not to be construed as limiting my invention.

Example 1

Thirty twelve-ounce oblong cans with tin-coated interior surfaces, of the type used in canning luncheon meats, were divided into three equal groups and marked I, J and K.

The cans in lot I were treated by spraying 0.1 gram of melted glycerol mono-stearate uniformly over the inner surfaces of each can.

The cans in lot J were treated by spraying 0.1 gram of melted mannitan mono-stearate uniformly over the inner surface of each can.

The cans in lot K were treated by spraying about 0.6 gram of melted lard uniformly over the inner surfaces of each can.

All three lots were then filled with beef luncheon meat, sealed and cooked in a steam retort under ten pounds steam pressure for ninety minutes. After removal from the steam retort the cans were stored for seven days at 70° F. and then opened.

The contents of lots I and J were easily removed by inverting the can, whereupon the meat slid out. There was no adhesion of meat particles to the inner surfaces of the cans.

In the case of lot K, however, the meat adhered so tenaciously to the inner surfaces of the can that vigorous shaking was necessary to remove the contents of the cans. Even this procedure failed to remove the contents of four cans, and it was necessary to use a fork to dig out the meat.

Example 2

Thirty twelve-ounce oblong cans with tin-coated interior surfaces, of the type used in canning luncheon meats, were divided into three equal groups and marked L, M and N.

The cans in lot L were treated by swabbing the inner surfaces with glycerol mono-oleate.

The cans in lot M were treated by swabbing the inner surfaces with mannitan mono-oleate.

The cans in lot N were treated by swabbing the inner surfaces with melted lard.

The swabbing, in all instances, was done by hand with a cotton swab dipped in the liquid coating material. Approximately 0.3 gram of the coating material per can was applied in this manner.

All of the cans were then filled with pork luncheon meat, sealed and cooked as in Example 1. After removal from the steam retort, the cans were stored at 70° F. for 14 days and then opened. The contents were removed by shaking the inverted cans. Examination of the inner surfaces of the containers showed that while there was some adhesion of meat particles to the surfaces of the cans in lot L and lot M, the adhesion of meat particles to the cans in lot N was objectionably greater.

While I prefer to use about 0.2 gram of coating material per about 45–50 square inches of surface, lesser amounts than this will prove beneficial in minimizing adhesion of meat to the said surfaces. I have found that glycerol monostearate and mannitan mono-stearate are extremely effective for this purpose, even when only 0.1 gram of these materials is used per about 45–50 square inches of surface. These materials are particularly effective in preventing adhesion of beef-containing meat products to the insides of the cans. Beef-containing meat products adhere to the inner surfaces of the cans even more tenaciously than do other types of meat products. Lard coated cans are practically without effect in minimizing adhesion of these beef-containing products. Glycerol mono-stearate and mannitan mono-stearate were far superior to lard in this respect, and cans interiorly coated wtih these materials result in a complete elimination of adhesion between the meat and inside surfaces of the cans.

It is manifest, from the above examples, that the coating materials of the present invention can be applied to the interior surfaces of the cans in any of several ways, as desired: My invention is not to be construed as limited to the methods of application described in the illustrative examples since other methods may be used, as will be evident to skilled workers in the art. Nor is it intended that it be limited in its application to animal protein matter, since it is readily applicable to marine protein materials, such as fish and fish products as well. Nor is my invention to be construed as limited to the coating of cans or similar containers since paper or similar wrapping materials can be covered with the coating materials of the present invention and the treated paper wrapped around meats prior to being placed in the cans. Furthermore, my invention is applicable to plastic and glass containers as well as those made of metal.

I claim:

1. The process of preventing the adhesion during cooking of proteinaceous meaty materials to the interior surfaces of a metal container which comprises the step of applying to said interior surfaces, prior to cooking the proteinaceous meaty materials in said container, a coating consisting essentially of a polyhydroxy alcohol partial ester of a non-hydroxy saturated fatty acid having at least 12 carbon atoms.

2. The process of preventing the adhesion during cooking of proteinaceous meaty materials to the interior surfaces of a metal container which comprises the step of applying to said interior surfaces, prior to cooking the proteinaceous meaty materials in said container, a coating consisting essentially of an esterified fatty acid material selected from the group consisting of polyhydroxy alcohol partial esters of non-hydroxy saturated and unsaturated fatty acids having at least 12 carbon atoms, inner ethers of hexahydroxy alcohol partial esters of non-hydroxy saturated and unsaturated fatty acids which contain at least 12 carbon atoms and mixtures thereof.

3. A container for proteinaceous meaty materials having a metallic interior surface covered with a coating consisting essentially of a normally solid polyhydroxy alcohol partial ester of a non-hydroxy saturated higher fatty acid containing at least 12 carbon atoms.

4. A container for proteinaceous meaty materials having a metallic interior surface covered with a coating consisting essentially of a normally solid inner ether of a hexahydroxy alcohol partial ester of a non-hydroxy saturated higher fatty acid containing at least 12 carbon atoms.

5. A container for proteinaceous meaty materials having a metallic interior surface covered with a coating consisting essentially of glycerol mono-stearate.

6. A container for proteinaceous meaty materials having a metallic interior surface covered with a coating consisting essentially of mannitol mono-stearate.

7. A container for proteinaceous meaty materials having a metallic interior surface covered with a coating consisting essentially of sorbitol mono-palmitate.

8. A container for proteinaceous meaty materials having a metallic interior surface covered with a coating consisting essentially of mannitan mono-stearate.

9. A container for proteinaceous meaty materials having a metallic interior surface covered with a coating consisting essentially of sorbitan mono-stearate.

10. A metal container for proteinaceous meaty materials having its interior surface covered with a coating consisting essentially of an esterified fatty acid material selected from the group consisting of polyhydroxy alcohol partial esters of non-hydroxy saturated and unsaturated fatty acids having at least 12 carbon atoms, inner ethers of hexahydroxy alcohol partial esters of non-hydroxy saturated and unsaturated fatty acids which contain at least 12 carbon atoms and mixtures thereof.

11. A metal container for proteinaceous meaty materials having its interior surface covered with a coating consisting essentially of a polyhydroxy alcohol partial ester of a non-hydroxy saturated fatty acid having at least 12 carbon atoms.

ALBERT C. EDGAR.

References Cited in the file of this patent

UNITED STATES PATENTS

| Number | Name | Date |
|---|---|---|
| 2,027,390 | Lazier et al. | Jan. 14, 1936 |
| 2,132,701 | Richardson et al. | Oct. 11, 1938 |
| 2,253,655 | Shurley | Aug. 26, 1941 |
| 2,387,626 | Ward | Oct. 23, 1945 |
| 2,398,082 | Cavallito | Apr. 9, 1946 |
| 2,422,486 | Johnston | June 17, 1947 |

OTHER REFERENCES

"Uses and Applications of Chemicals and Related Materials," 1944, vol. II, by T. C. Gregory, published by Reinhold Publishing Corporation, 330 West Forty-second Street, New York, page 155, article entitled "Glyceryl Monostearate."

"Commercial Waxes," 1944, by H. Bennett, published by Chemical Publishing Company, Inc., Brooklyn, New York, pages 105 and 106, article entitled "Glyceryl Monostearate S."